United States Patent
Dange et al.

(10) Patent No.: US 12,026,247 B2
(45) Date of Patent: *Jul. 2, 2024

(54) SYSTEM AND METHOD FOR ENABLING A USER TO CREATE AN ACCOUNT ON AN APPLICATION OR LOGIN INTO THE APPLICATION WITHOUT HAVING THE USER REVEAL THEIR IDENTITY

(71) Applicant: Amod Ashok Dange, Mountain View, CA (US)

(72) Inventors: Amod Ashok Dange, Mountain View, CA (US); Yash Mody, Mumbai (IN)

(73) Assignee: Amod Ashok Dange, Mountain View, CA (US)

( * ) Notice: Subject to any disclaimer, the term of this patent is extended or adjusted under 35 U.S.C. 154(b) by 336 days.

This patent is subject to a terminal disclaimer.

(21) Appl. No.: 17/481,465

(22) Filed: Sep. 22, 2021

(65) Prior Publication Data

US 2022/0004619 A1 Jan. 6, 2022

Related U.S. Application Data

(63) Continuation-in-part of application No. 17/018,273, filed on Sep. 11, 2020, now Pat. No. 11,582,032.

(Continued)

(51) Int. Cl.
*G06F 21/45* (2013.01)
*G06F 21/32* (2013.01)
(Continued)

(52) U.S. Cl.
CPC ............ *G06F 21/45* (2013.01); *G06F 21/32* (2013.01); *H04L 9/0866* (2013.01); *H04L 9/30* (2013.01);
(Continued)

(58) Field of Classification Search
CPC .......... G06F 21/45; G06F 21/32; G06F 7/588; G06F 2221/2117; H04L 9/0866; H04L 9/30; H04L 9/0869; H04L 9/0894
See application file for complete search history.

(56) References Cited

U.S. PATENT DOCUMENTS

| | | |
|---|---|---|
| 6,401,206 B1 | 6/2002 | Khan et al. |
| 7,013,290 B2 | 3/2006 | Ananian |

(Continued)

FOREIGN PATENT DOCUMENTS

| | | |
|---|---|---|
| JP | 4675660 B2 | 10/2006 |
| JP | 2014127164 A | 7/2014 |

OTHER PUBLICATIONS

Non-Final Rejection for U.S. Appl. No. 17/018,273 dated Jun. 22, 2022 including PTO-892 attached thereto (12 pgs).

(Continued)

*Primary Examiner* — Han Yang
(74) *Attorney, Agent, or Firm* — Shumaker, Loop & Kendrick, LLP (57) ABSTRACT

A system and method for enabling a user to create an account on an application and login into the application, without having the user reveal their identity, is described herein. The system is configured for registering a user by receiving a set of biometric samples of the user, processing the set of biometric samples to compute a Secret-Key (S1) corresponding to the user, generating a Unique-Number (N1) using a random number generation algorithm, applying a Function (F1) to the Secret-Key (S1) and the Unique-Number (N1), to compute a Public-Key (P1). Once the user is registered, the system is configured to receive an account creation request from an application. Further, the system is configured to receive a biometric sample from the user in real-time and compute the Secret-Key (S2) for authenticating the user. Once the user is authenticated, the system may (Continued)

generate an Application User ID based on the authentication and transmit to the application a request to enable the user to create an account on the application or login to the application, wherein the request comprises the Application User ID.

20 Claims, 7 Drawing Sheets

Related U.S. Application Data (60) Provisional application No. 63/029,717, filed on May 26, 2020, provisional application No. 62/954,591, filed on Dec. 29, 2019, provisional application No. 62/906,080, filed on Sep. 25, 2019.

(51) Int. Cl.
*H04L 9/08* (2006.01)
*H04L 9/30* (2006.01)
*G06F 7/58* (2006.01)

(52) U.S. Cl.
CPC ...... *G06F 7/588* (2013.01); *G06F 2221/2117* (2013.01)

(56) References Cited

U.S. PATENT DOCUMENTS

| | | |
|---|---|---|
| 7,039,805 B1 | 5/2006 | Messing |
| 7,093,131 B1 | 8/2006 | Kobayashi |
| 7,340,438 B2 | 3/2008 | Nordman et al. |
| 7,496,191 B1 | 2/2009 | Crews et al. |
| 7,769,633 B2 | 8/2010 | Jokinen et al. |
| 8,170,615 B2 | 5/2012 | Vanska et al. |
| 9,633,269 B2 | 4/2017 | Gu et al. |
| 10,136,191 B1 | 11/2018 | Lewis et al. |
| 10,489,826 B2 | 11/2019 | Matthews et al. |
| 10,530,577 B1 | 1/2020 | Pazhoor et al. |
| 11,252,479 B2 | 2/2022 | Lewis et al. |
| 2003/0028451 A1* | 2/2003 | Ananian ............ G06Q 30/0615 705/26.42 |
| 2003/0135740 A1 | 7/2003 | Talmor et al. |
| 2006/0085844 A1 | 4/2006 | Buer et al. |
| 2007/0271463 A1 | 11/2007 | Ginter et al. |
| 2008/0072068 A1 | 3/2008 | Wang et al. |
| 2009/0271634 A1 | 10/2009 | Boult et al. |
| 2012/0033807 A1 | 2/2012 | Asim et al. |
| 2014/0006290 A1 | 1/2014 | Hozanne et al. |
| 2015/0006895 A1* | 1/2015 | Irvine ................ G06F 21/6209 713/171 |
| 2015/0046699 A1 | 2/2015 | Benteo et al. |
| 2015/0095999 A1 | 4/2015 | Toth |
| 2015/0134552 A1 | 5/2015 | Engels et al. |
| 2015/0269389 A1 | 9/2015 | Lee |
| 2015/0280921 A1 | 10/2015 | Geoffrey |
| 2016/0050213 A1 | 2/2016 | Storr |
| 2016/0219046 A1 | 7/2016 | Ballard et al. |
| 2017/0141920 A1* | 5/2017 | Herder, III ................ H04L 9/14 |
| 2017/0372059 A1 | 12/2017 | Sindia et al. |
| 2018/0173871 A1 | 6/2018 | Toth |
| 2018/0307859 A1 | 10/2018 | LaFever et al. |
| 2019/0097812 A1 | 3/2019 | Toth |
| 2019/0182176 A1 | 6/2019 | Niewczas |
| 2019/0306151 A1 | 10/2019 | Hamel et al. |
| 2020/0204545 A1 | 6/2020 | Pacella et al. |
| 2020/0266989 A1* | 8/2020 | Krcmaricic-Barackov ................. H04L 9/30 |
| 2020/0296093 A1 | 9/2020 | Hoyos |
| 2021/0058246 A1 | 2/2021 | Stolbikov et al. |
| 2021/0091937 A1 | 3/2021 | Dange et al. |
| 2022/0004613 A1 | 1/2022 | Dange et al. |
| 2022/0004661 A1 | 1/2022 | Dange et al. |
| 2022/0006815 A1* | 1/2022 | Dange .................. H04L 9/0866 |

OTHER PUBLICATIONS

Sy et al. "Generation of Cryptographic Keys from Personal Biometrics: An Illustration Based on Fingerprints." dated Nov. 28, 2021, pp. 1-35.
Hochrieser, "Online Dating Can Benefit From Identity Verification and Biometric Authentication in 2019", Information Security Buzz, dated Jul. 18, 2019 pp. 1-5.
Arsenova, "Face Liveness Detection for Safe Biometric Authentication and Face Recognition", dated Jan. 27, 2020, pp. 1-10.
M. Kapko et al., "What is Windows Hello? Microsoft's biometrics security system explained" dated Jan. 12, 2021, pp. 1-5.
Mjaaland et al., "Biocryptics: Towards Robust Biometric Public/Private Key Generation", The Norwegian Information Security Conference (NISK) dated 2009, pp. 27-42.
Chandra et al., "Generate an Encryption Key by using Biometric Cryptosystems to secure transferring of Data over a Network", IOSR Journal of Computer Engineering (IOSR-JCE), vol. 12, Issue 1, dated May-Jun. 2013), pp. 1-11.
Final Rejection for U.S. Appl. No. 17/018,273 dated Sep. 14, 2022 (15 pages).
Notice of Allowance (NOA) for U.S. Appl. No. 17/018,273 dated Dec. 5, 2022 (10 pages).
Non-Final Office Action (NFOA) issued for U.S. Appl. No. 17/481,474 mailed Feb. 26, 2024 (11 pages).
Non-Final Office Action (NFOA) issued for U.S. Appl. No. 17/481,478 mailed Jan. 31, 2024 (11 pages).
Notice of Allowance (NOA) issued for U.S. Appl. No. 17/481,478 mailed Feb. 28, 2024 (11 pages).
Corrected Notice of Allowability issued for U.S. Appl. No. 17/481,478, mailed Mar. 7, 2024 (2 pages).
Non-Final Office Action (NFOA) issued for U.S. Appl. No. 17/481,468, mailed Mar. 21, 2024 (11 pages).
Notice of Allowance (NOA) issued for U.S. Appl. No. 17/481,468, mailed Apr. 26, 2024 (10 pages).
Corrected Notice of Allowance issued for U.S. Appl. No. 17/481,478, mailed Apr. 17, 2024 (4 pages).
Corrected Notice of Allowance issued for U.S. Appl. No. 17/481,478, mailed Mar. 29, 2024 (4 pages).
Notice of Allowance (NOA) issued for U.S. Appl. No. 17/481,474, mailed May 16, 2024 (11 pages).

* cited by examiner

SYSTEM AND METHOD FOR ENABLING A USER TO CREATE AN ACCOUNT ON AN APPLICATION OR LOGIN INTO THE APPLICATION WITHOUT HAVING THE USER REVEAL THEIR IDENTITY

CROSS-REFERENCE TO RELATED APPLICATIONS AND PRIORITY

The present application is a Continuation in Parts (CIP) application of U.S. Complete application Ser. No. 17/018,273 filed on Sep. 11, 2020 entitled "System and method for sharing user preferences without having the user reveal their identity", which claims priority from U.S. Provisional Application No. 62/906,080 filed on Sep. 25, 2019 entitled "Method and system of managing personal and business information", the U.S. Provisional Application No. 62/954,591 filed on Dec. 29, 2019 entitled "Method and system for anonymously matching consumers and businesses", and U.S. Provisional Application No. 63/029,717 filed on May 26, 2020 entitled "Method and system of storing identity and signature using the human body as a node."

TECHNICAL FIELD

The present subject matter described herein, in general, relates to a system and a method for enabling a user to login or create an account on an application. More specifically, the present subject matter discloses the system and method for enabling a user to login or create an account on an application, without having the user reveal their identity.

BACKGROUND

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Traditionally, software applications require people to provide their identity as well as personal information in order to get themselves registered on an application. However, this practice has resulted in several undesirable outcomes. People end up creating a different profile for each application such as Gmail™, Twitter™, Amazon™ etc. As the number of profiles increases, it becomes difficult to manage these profiles. On an average an online user has 7.6 social media accounts. Many of these online profiles are created using fake identities. An estimated 30% of profiles on social media are based on fake identities. Moreover, in the existing social networking platforms, there is no barrier to keep a user from creating a profile that corresponds to someone other than themselves. Furthermore, users don't always have control over their online profile's visibility to others within or outside of their own human network. User privacy is also at risk as different applications have different privacy standards.

Additionally, software applications often collect more personal information from users than is needed to provide the application's functionality. This information may be misused by these software applications for targeted advertising. Generally, the information captured by these software applications is used to run advertising campaigns targeted at social media audience cohorts whose attributes are extrapolated from their online activity. This may include the web searches they perform, the content they consume, and the social media posts they engage with. This method poses several limitations. The search and social media platforms that track users' activity often have access to users' identity. Although social media platforms mask their users' identity from advertisers and developers, there is a massive burden on the social media platforms to protect their users' identity and keep it hidden from advertisers and developers at all times. More importantly, users' identity is not hidden from the platforms themselves, thereby creating an exception for the platforms in respect of the rule applied to the advertisers that no single entity should have access to people's identity as well as activity.

Furthermore, ecommerce businesses such as Amazon™ and eBay™ capture users' activity data on one product platform and apply it to other products using shared cookies. Users often have no visibility into which businesses have access to what part of their personal information. The collection of users' attributes and preferences is a one-way flow. Platforms gather users' activity data and retain it permanently. Users have no control over their own activity data once it has been captured by the platform. Moreover, users do not use platforms with the intention of providing the platforms with their personal information. Therefore, finding themselves to be the target of advertisements based on specific personal attributes detected by platforms makes them feel violated. Platforms algorithmically interpret people's engagement data to deduce their attributes and preferences. Hence, there is a level of abstraction between users' actual attributes and preferences, and those targeted by businesses in their advertising campaigns on platforms.

Also, there is an inherent limit to how deeply businesses can understand a user's real attributes and preferences. Users do not know how much of their personal information and preferences that they did not share with anyone intentionally is stored and shared by platforms. This causes widespread anxiety and stress among people.

Furthermore, users' identities on the internet are stored on a network server. The server requires resources to host users' identities, keep them secure, and perform regular maintenance. Users do not always have control over their digital identity stored on the server. Every identity on the server does not necessarily correspond to a unique person. In the existing art there is no known way to prevent the storage of identities. People need to manage credentials to access their own identities on the servers.

To address some of the above issues and to manage credentials of a multitude of applications, Single Sign-On mechanisms such as OAUTH and SAML are used. The Single Sign-on mechanism allows applications to use tokens and transfer the burden of authentication to federated identity providers such as Google™ and Apple™ During the handoff from a third-party authentication to the client application, typically, personally identifiable information such as name, email, profile photo, etc., is also shared with the client application in an opt-out manner. This reintroduces vulnerabilities in the client application and negates the separation of identity authentication in the first place. Even if no personally identifiable information is handed off to the client application, the third-party authentication system is still susceptible to the same security challenges and all weaknesses are passed on downstream.

Another technique adopted for security is two-factor authentication. There are several ways by which two-factor authentication can be enabled in order to provide an additional layer of security. One method is by sending a code over email or text message. This assumes that the client application has access to the user's email or phone number which, if true, also means that they have the ability to determine the user's identity with relative ease. Additionally, if the user's phone or email are compromised, this system works in favor of the perpetrator and further injures the victim. Another method of two-factor authentication is enabled by generating a code via a separate authentication application. It assumes that the user has control over that authentication application. If the user loses access to the authenticator application, they lose access to their identity manager. Yet another method of two-factor authentication is enabled by having the user remember a pass-phrase, a visual shape, or answers that they made up for a number of personal questions, or any variant thereof. This usually results in an unreasonable barrier for the user and a bad user experience.

Furthermore, historically personalized software applications require users to set a username (unique string, email, or phone number) and a password, in order to have secure access to a personalized account. In case the username is the user's email or phone number, the user's identity is revealed to the application. If the username is a string, the application still requires the user's email or phone number to enable the user to reset the password if it is lost.

Emails and phone numbers are not private. Unlisted phone numbers and email addresses can be traced back to their owners with relative ease. When people register on a service using their email address or phone number, their identity becomes vulnerable to attacks. History indicates that it is almost certain that every user's personal information will be leaked at some point. In recent times, there are an increasing number of cases, where personal data of millions of social media users has been leaked and posted online. And since their accounts with all services are tied to either an email, or a phone number, or both, when data from multiple services are compromised, leaked information can be combined, resulting in further injury to the users whose data is leaked.

The world's most powerful technology companies have utterly failed to protect people's privacy. This is primarily because they are still continuing to use peoples' email or phone numbers to uniquely identify them within their systems. While only the most high-profile data breaches get reported, a vast majority of data breaches go unreported. Overall, there is overwhelming evidence demonstrating that online privacy does not exist in any meaningful way.

Thus, clearly the most effective way for any company to prevent their users' privacy from being breached is to not have their systems access their users' identities in the first place. As demonstrated in U.S. PTO patent application Ser. No. 17/018,273 filed on Sep. 11, 2020 entitled "System and method for sharing user preferences without having the user reveal their identity", an application can very well provide personalized services to users without having access to their identity, and indeed to their personally identifiable information.

Thus, there is a long-felt need for a system and method of managing an online account without utilizing a username or password.

SUMMARY

This summary is provided to introduce concepts related to a system and a method for enabling a user to sign up or login into an application without having the user reveal their identity, and the concepts are further described below in the detailed description. This summary is not intended to identify essential features of the claimed subject matter nor is it intended for use in determining or limiting the scope of the claimed subject matter.

In one implementation, a system for enabling a user to create an account on an application, without having the user reveal their identity, is illustrated in accordance with an embodiment of the invention. The system comprises a processor and a memory coupled to the process. The processor is configured to execute program instructions stored in the memory for registering a user. For the purpose of registering the user, the processor may execute program instructions stored in the memory to receive a set of biometric samples of the user corresponding to one or more biometric factors, process the set of biometric samples to compute a Secret-Key (S1) corresponding to the user, generate a Unique-Number (N1) using a random number generation algorithm, apply a Function (F1) to the Secret-Key (S1) and the Unique-Number (N1) to compute a Public-Key (P1), store the Unique-Number (N1) on a user device and in a data repository, and store the Public-Key (P1) on a storage device. Once the user is registered, each time the user makes a request to create an account over the application, the processor is configured for receiving an account creation request from the application. Upon receipt of the account creation request, the processor may execute program instructions stored in the memory to authenticate the user. For the purpose of authentication, the processor may execute program instructions stored in the memory to receive a biometric sample captured from the user in real-time, process the biometric sample to generate a Secret-Key (S2), fetch the Public-Key (P1) corresponding to the user from the user device, and compute a Real-Time-Unique-Number (N2) using the Public-Key (P1), the Secret-Key (S2) and the Function (F1). Based on the comparison of the Real-Time-Unique-Number (N2) with the Unique-Number (N1) stored on the user device, the user is authenticated. Once the user is authenticated, the processor may execute program instructions stored in the memory to generate an Application User ID based on the authentication. Further, the processor may be configured for transmitting to the application a request to enable the user to create an account on the application, wherein the request comprises the Application User ID.

In another implementation, a method for enabling a user to create an account on an application, without having the user reveal their identity, is illustrated in accordance with an embodiment of the invention. The method may comprise one or more steps for registering a user. For the purpose of registering the user, the method may comprise one or more steps to receive a set of biometric samples of the user corresponding to one or more biometric factors, process the set of biometric samples to compute a Secret-Key (S1) corresponding to the user, generate a Unique-Number (N1) using a random number generation algorithm, apply a Function (F1) to the Secret-Key (S1) and the Unique-Number (N1) to compute a Public-Key (P1), store the Unique-Number (N1) on a user device and in a data repository, and store the Public-Key (P1) on a storage device. Once the user is registered, each time the user makes a request to create an account over the application, the method may comprise steps of receiving an account creation request from the application. Upon receipt of the account creation request, the method may comprise one or more steps for authenticating the user. For the purpose of authentication, method may comprise one or more steps to receive a biometric sample captured from the user in real-time, process the biometric sample to generate a Secret-Key (S2), fetch the Public-Key (P1) corresponding to the user from the user device, and compute a Real-Time-Unique-Number (N2) using the Public-Key (P1), the Secret-Key (S2) and the Function (F1). Based on the comparison of the Real-Time-Unique-Number (N2) with the Unique-Number (N1) stored on the user device, the user is authenticated. Once the user is authenticated, the method may further comprise one or more steps to generate an Application User ID based on the authentication. Further, the method may comprise one or more steps to transmit to the application a request to enable the user to create an account on the application, wherein the request comprises the Application User ID.

In one implementation, a system for enabling a user to obtain authenticated access to an application, without having the user reveal their identity, is illustrated in accordance with an embodiment of the invention. The system comprises a processor and a memory coupled to the process. The processor is configured to execute program instructions stored in the memory for registering a user. For the purpose of registering the user, the processor may execute program instructions stored in the memory to receive a set of biometric samples of the user corresponding to one or more biometric factors, process the set of biometric samples to compute a Secret-Key (S1) corresponding to the user, generate a Unique-Number (N1) using a random number generation algorithm, apply a Function (F1) to the Secret-Key (S1) and the Unique-Number (N1) to compute a Public-Key (P1), store the Unique-Number (N1) on a user device and in a data repository, and store the Public-Key (P1) on the storage device. Once the user is registered, each time the user makes a request to login into an account over the application, the processor is configured to receive a login request from the application. Upon receipt of the login request, the processor may execute program instructions stored in the memory to authenticate the user. For the purpose of authentication, the processor may execute program instructions stored in the memory to receive a biometric sample captured from the user in real-time, process the biometric sample to generate a Secret-Key (S2), fetch the Public-Key (P1) corresponding to the user from the user device, and compute a Real-Time-Unique-Number (N2) using the Public-Key (P1), the Secret-Key (S2) and the Function (F1). Based on the comparison of the Real-Time-Unique-Number (N2) with the Unique-Number (N1) stored on the user device, the user is authenticated. Once the user is authenticated, the processor may execute program instructions stored in the memory to transmit to the application a request to enable the user to obtain authenticated access to the application, wherein the request comprises the Application User ID.

In another implementation, a method for enabling a user to obtain authenticated access to an application, without having the user reveal their identity, is illustrated in accordance with an embodiment of the invention. The method may comprise one or more steps for registering a user. For the purpose of registering the user, method may comprise one or more steps to receive a set of biometric samples of the user corresponding to one or more biometric factors, process the set of biometric samples to compute a Secret-Key (S1) corresponding to the user, generate a Unique-Number (N1) using a random number generation algorithm, apply a Function (F1) to the Secret-Key (S1) and the Unique-Number (N1) to compute a Public-Key (P1), store the Unique-Number (N1) on a user device and in a data repository, and store the Public-Key (P1) on a storage device. Once the user is registered, each time the user makes a request to log into the application, the method may comprise steps to receive a login request from the application. Upon receipt of the login request, the method may comprise one or more steps to authenticate the user. For the purpose of authentication, method may comprise one or more steps to receive a biometric sample captured from the user in real-time, process the biometric sample to generate a Secret-Key (S2), fetch the Public-Key (P1) corresponding to the user from the user device, and compute a Real-Time-Unique-Number (N2) using the Public-Key (P1), the Secret-Key (S2) and the Function (F1). Based on the comparison of the Real-Time-Unique-Number (N2) with the Unique-Number (N1) stored on the user device, the user is authenticated. Once the user is authenticated, the method may further comprise one or more steps to transmit to the application a request to enable the user to obtain authenticated access to the application.

BRIEF DESCRIPTION OF DRAWINGS

The detailed description is described with reference to the accompanying Figures. The same numbers are used throughout the drawings to refer like features and components.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
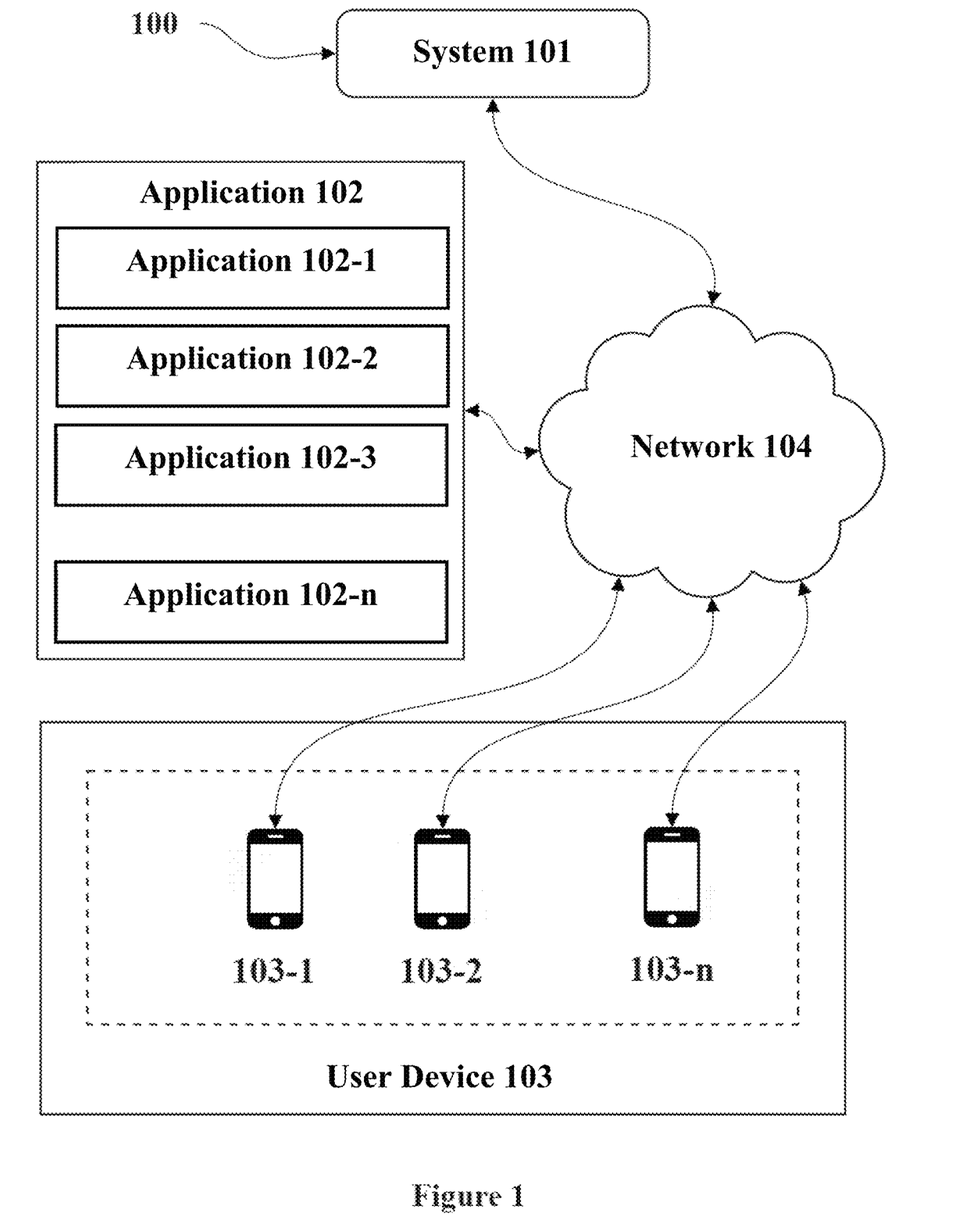
FIG. 1 illustrates a network implementation 100 of a system 101 to create an account on an application and obtain authenticated access to the application, in accordance with an embodiment of the present disclosure.

Referring to FIG. 1, implementation 100 of system 101 for creating and logging into an account on an application is illustrated, in accordance with an embodiment of the present subject matter. In one embodiment, the system 101 may comprise a processor and a memory. Further, the system 101 may be connected to user devices and applications through a network 104. It may be understood that the system 101 may be communicatively coupled with multiple users through one or more user devices 103-1, 103-2, 103-3 . . . , 103-n and applications 102-1, 102-2, 102-3 . . . , 102-n collectively referred to as a user device 103 and applications 102.

In one embodiment, the network 104 may be a cellular communication network used by user devices 103 such as mobile phones, tablets, or a virtual device. In one embodiment, the cellular communication network may be the Internet. The user device 103 may be any electronic device, communication device, image capturing device, machine, software, automated computer program, a robot or a combination thereof. Further the applications 102 may be any networking platform, media platform, messaging platform, ecommerce platform, or any other application platform. The system 101 may be configured to register users as well as applications 102 over the system 101. Further, the system 101 may be configured to authenticate the user, each time the user makes a request to access the system 101. Furthermore, the system 101 may enable the user to access the applications 102 without having the user reveal their identity.

In one embodiment, the user devices 103 may support communication over one or more types of networks in accordance with the described embodiments. For example, some user devices and networks may support communications over a Wide Area Network (WAN), the Internet, a telephone network (e.g., analog, digital, POTS, PSTN, ISDN, xDSL), a mobile telephone network (e.g., CDMA, GSM, NDAC, TDMA, E-TDMA, NAMPS, WCDMA, CDMA-2000, UMTS, 3G, 4G), a radio network, a television network, a cable network, an optical network (e.g., PON), a satellite network (e.g., VSAT), a packet-switched network, a circuit-switched network, a public network, a private network, and/or other wired or wireless communications network configured to carry data. The aforementioned user devices 103 and network 104 may support wireless local area network (WLAN) and/or wireless metropolitan area network (WMAN) data communications functionality in accordance with Institute of Electrical and Electronics Engineers (IEEE) standards, protocols, and variants such as IEEE 802.11 ("WiFi"), IEEE 802.16 ("WiMAX"), IEEE 802.20x ("Mobile-Fi"), and others.

In one embodiment, the user devices 103 are enabled with biometric scanning capabilities. Furthermore, the user devices 103 are also enabled to maintain a distributed global people's registry. The Distributed Global People Registry may be an autonomous free public utility that stores the public-key of every registered person.

In one embodiment, the application 102 may be a networking platform, an ecommerce platform, or any other internet-based software application which requires user authentication before providing the user with access to the application. The user registration process over the system 101 is further illustrated with the block diagram in FIG. 2.

Figure 2:
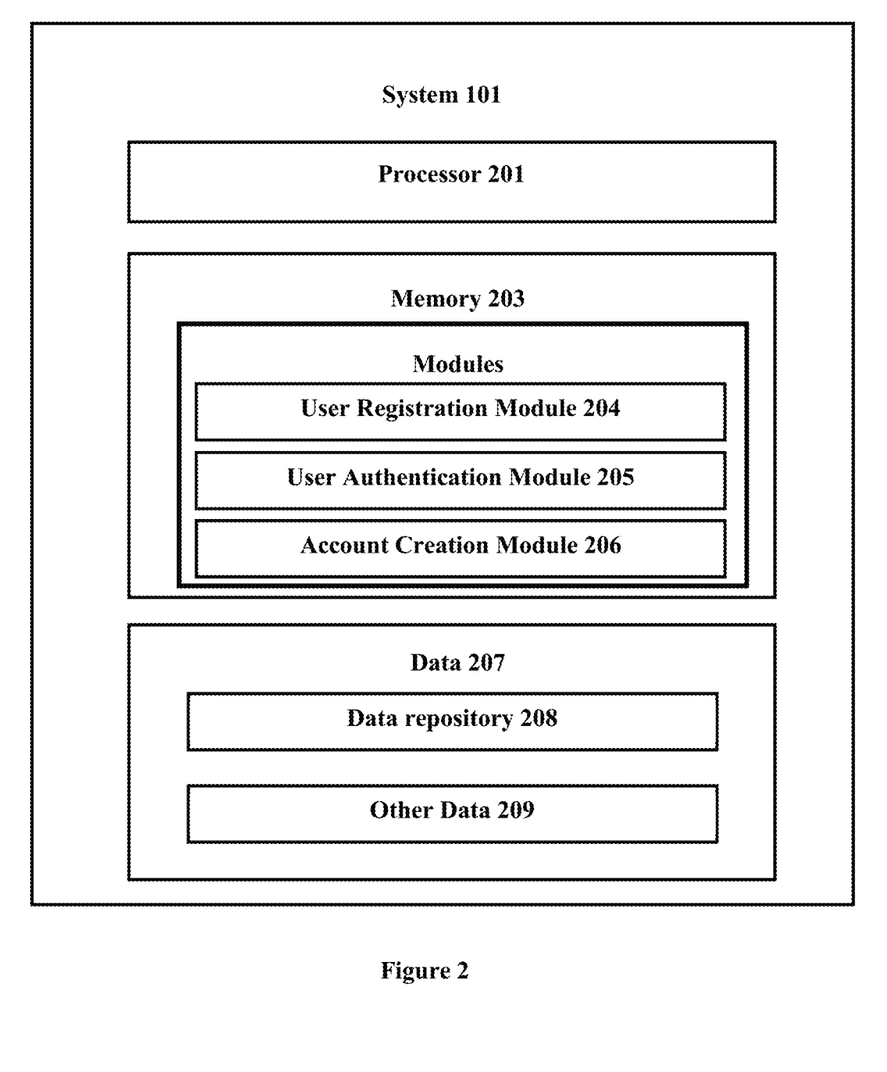
FIG. 2 illustrates components of the system 101 to create the account on the application and to obtain authenticated access to the application, in accordance with an embodiment of the present disclosure.

Referring now to FIG. 2, various components of the system 101 are illustrated, in accordance with an embodiment of the present subject matter. As shown, the system 101 may include at least one processor 201 and a memory 203. The memory consists of a set of modules. The set of modules may include a user registration module 204, a user authentication module 205, and an account management module 206. In one embodiment, the at least one processor 201 is configured to fetch and execute computer-readable instructions, stored in the memory 203, corresponding to each module.

In one embodiment, the memory 203 may include any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and memory cards.

In one embodiment, the programmed instructions 205 may include routines, programs, objects, components, data structures, etc., which perform particular tasks, functions, or implement particular abstract data types. The data 207 may comprise a data repository 208, and other data 209. The other data 209 amongst other things, serves as a repository for storing data processed, received, and generated by one or more components and programmed instructions. The working of the system 101 will now be described in detail referring to FIGS. 1 and 2.

In one embodiment, the processor 201 may be configured for executing programmed instructions corresponding to user registration module 204 for registering a user over the system 101. For the purpose of registration, a user may send a request for registration to the system 101 from the user device 103. Once the request is received, the processor 201 may receive a set of biometric samples of the user, corresponding to one or more biometric factors. The one or more biometric factors may correspond to fingerprint, face, voice, retina, and palm vein. It must be understood that the one or more biometric factors are not limited only to fingerprint, face, voice, retina, and palm vein. Any other biometric factors which can uniquely identify a user may be collected from the user. The set of biometric samples may be captured by the user device 103 and sent to the system 101 for registration. Further, the processor 201 is configured to process the set of biometric samples to compute a Secret-Key (S1) corresponding to the user. For the purpose of computing the Secret-Key (S1) a set of unique characteristics of the biometric samples may be determined. These unique characteristics must be reproducible every time the user scans their biometrics. Further, the processor 201 is configured to generate a Unique-Number (N1). The Unique-Number (N1) may be computed using any random number generation algorithm known in the art. The Unique-Number (N1) is a random number generated only once by the random number generation algorithm. Further, the processor 201 is configured to apply a Function (F1) to the Secret-Key (S1) and the Unique-Number (N1) to compute a Public-Key (P1). The Function (F1) may be based on Asymmetric Key Encryption which consumes the Secret-Key (S1) and the Unique-Number (N1) to compute a Public-Key (P1). In alternative embodiments, the Function (F1) may be based on any other encryption technique that is known in the art.

In one embodiment, once the Secret-Key (S1), Unique-Number (N1), and Public-Key (P1) are captured, in the next step, the processor 201 is configured for storing the Public-Key (P1) of the user on the storage device. The storage device may be internal memory of the user device 103. The storage device may also be virtual memory enabled over a remote server of a cloud storage space. In a similar manner, multiple users may be registered over the system 101. Every time the user makes a request to access the system 101, the Unique-Number (N1) and the Public-Key (P1) is used for authentication. It must be noted that the Secret-Key (S1) is not stored on the user device 103 or the system 101. Rather, at the time of authentication, a Secret-Key is computed in real-time. The process for user authentication is stated below.

In one embodiment, the user authentication may be triggered through the user device 103 upon receipt of an account creation request or a login request from the Application 102.

The account creation request or a login request may be received upon scanning of a machine-readable code. The machine-readable code may be in the form of a Barcode or a QR code. The login request may comprise a web socket ID. The communication of the system 101 with the application 102 may be enabled using the web socket ID.

On the receipt of the account creation request or login request, the processor 201 may be configured for executing programmed instructions corresponding to user authentication module 205 for authenticating the user. Initially the processor 201 may execute programmed instructions stored in the memory for receiving a biometric sample from the user. The biometric sample may be captured from the user in real-time. Further, the processor 201 may execute programmed instructions stored in the memory for processing the biometric sample to generate a Secret-Key (S2). It must be noted that the Secret-Key (S2) will be different from Secret-Key (S1) if the user is not the same person. Further, the processor 201 may execute programmed instructions stored in the memory for fetching the Public-Key (P1) corresponding to the user from the user device 103. Further, the processor 201 may execute programmed instructions stored in the memory for computing a Real-Time-Unique-Number (N2) using the Public-Key (P1), the Secret-Key (S2) and the Function (F1). Furthermore, the processor 201 may execute programmed instructions stored in the memory for authenticating the user based on comparison of the Real-Time-Unique-Number (N2) with the Unique-Number (N1) stored on the user device 103. It must be noted that when biometric samples from the same user are captured, the Secret-Key (S2) which is generated in real-time is the same as the Secret-Key (S1) which was used during user registration. As a result, the Real-Time-Unique-Number (N2) generated using the Public-Key (P1), the Secret-Key (S2) and the Function (F1) will be the same as the Unique-Number (N1) stored in the user device 103 and in a Data Repository 208. In case false biometrics are provided during authentication, the Secret-Key (S2) generated in real-time will not be the same as the Secret-Key (S1). Due to this, the Real-Time-Unique-Number (N2) will not be equal to the Unique-Number (N1) and the authentication will fail. It must be noted that during the entire authentication process, the only connection established with the user is through biometric scanning. As a result, authentication fraud as well as duplicate account generation is prevented, while keeping the user's identity private, since there is no need for the user to share their phone number, email address, or any other personally identifiable information.

If the user is successfully authenticated, the processor 201 may be configured for executing programmed instructions corresponding to the Account Creation Module 206. For this purpose, when the user scans the code on the signup page, the processor 201 may execute programmed instructions stored in the memory for transmitting to the application a request to enable the user to create an account on the application 102. The request may comprise an Application User ID associated with the user. The Application User ID may be a random and unique alphanumeric string. Furthermore, the processor 201 may execute programmed instructions stored in the memory for transmitting to the application a request to enable the user to obtain authenticated access to the application. The method for enabling the user to create an account on an application or login into an application, without having the user reveal their identity is further elaborated with the flowchart of FIG. 3.

Figure 3:
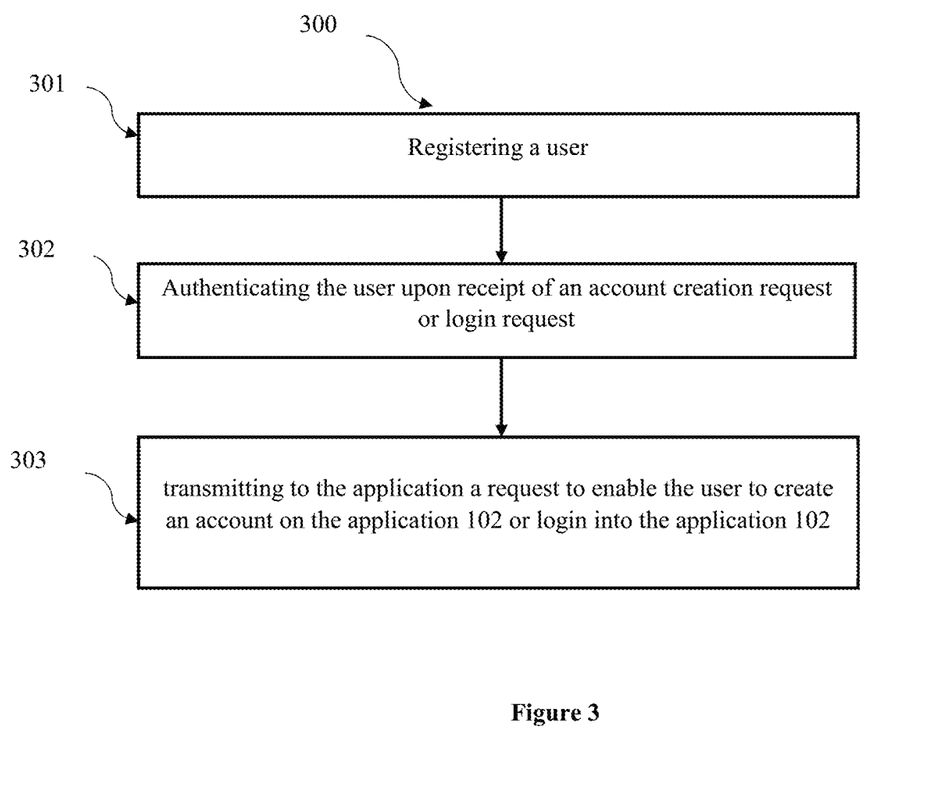
FIG. 3 illustrates a method 300 to create the account on the application and obtain authenticated access to the application, without having the user reveal their identity, in accordance with an embodiment of the present disclosure.

Now referring to FIG. 3, a method 300 for creating an account on an application or login into the application, without having the user reveal their identity is illustrated, in accordance with an embodiment of the present subject matter.

At step 301, the processor 201 may be configured for registering a user over the system 101. The detailed steps for registering a user over the system 101 are further elaborated with reference to FIG. 4.

At step 302, the processor 201 may be configured for receiving an account creation request or login request from the application 102 and authenticate the user over the system 101. The detailed steps for authenticating a user over the system 101 are further elaborated with reference to FIG. 5.

Figure 6A:
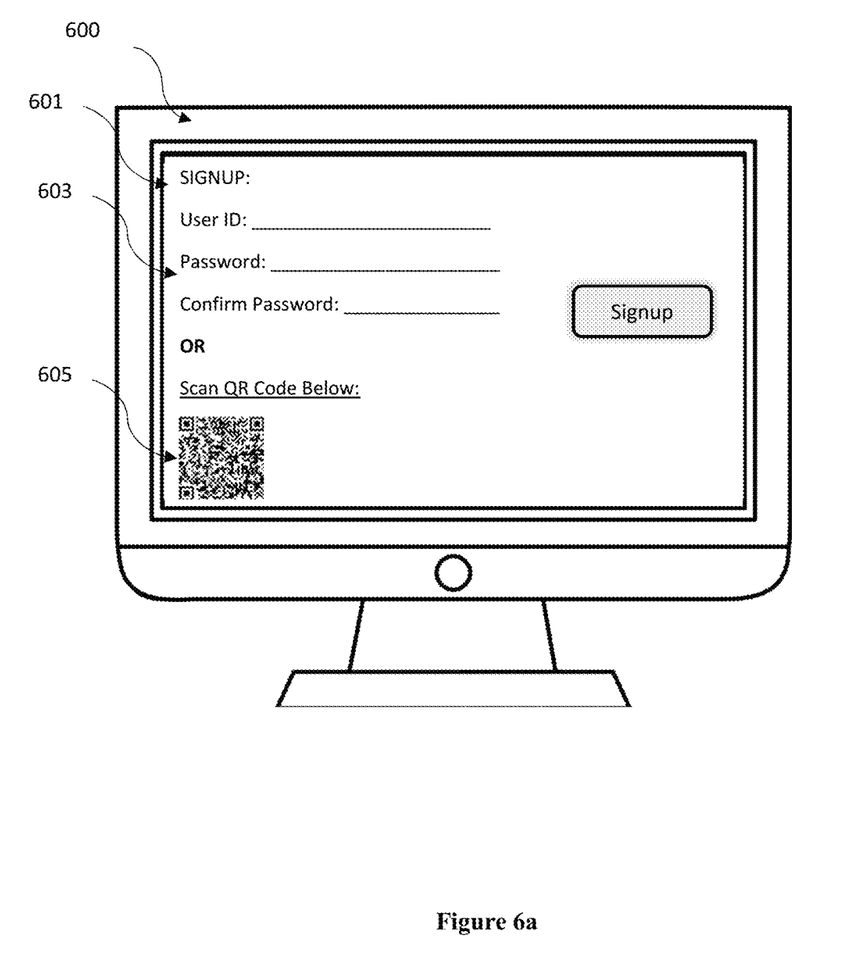
FIG. 6a and FIG. 6b illustrates a user interface for creating the account on the application and obtaining authenticated access to the application, without having the user reveal their identity, in accordance with an embodiment of the present disclosure.
Figure 6B:
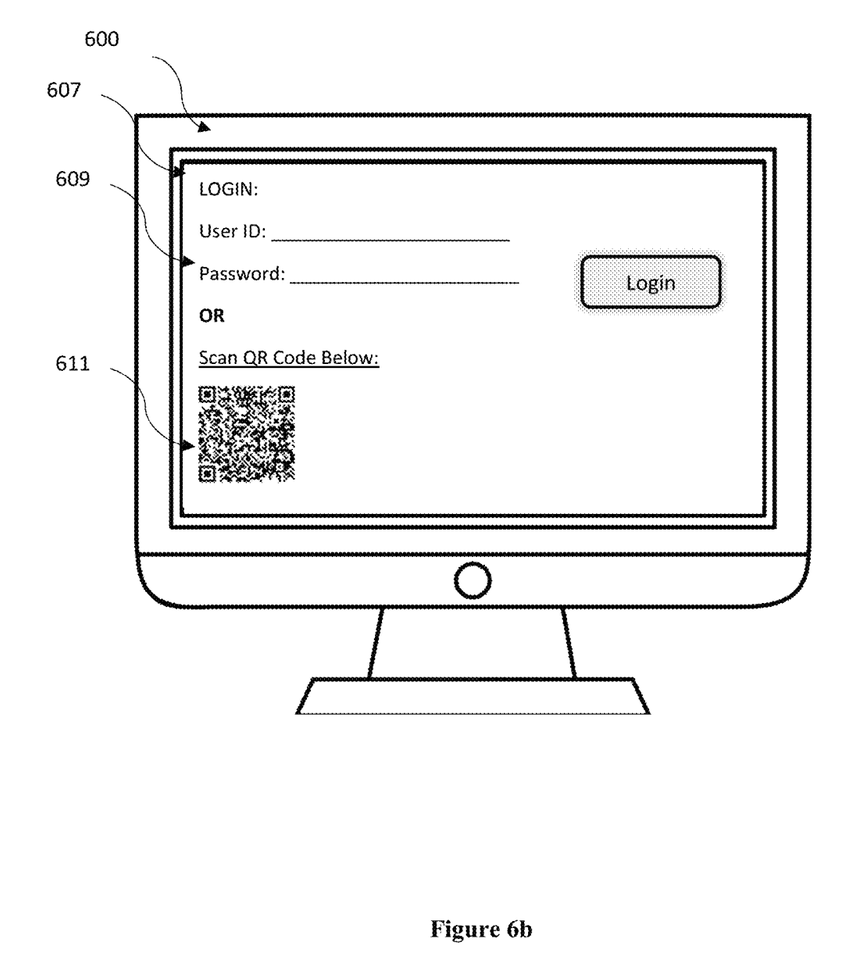

At step 303, the processor 201 may be configured for transmitting to the application a request to enable the user to create an account on the application 102 or login into the application 102. The steps for creating an account or logging into an existing account are further illustrated in FIG. 6.

Figure 4:
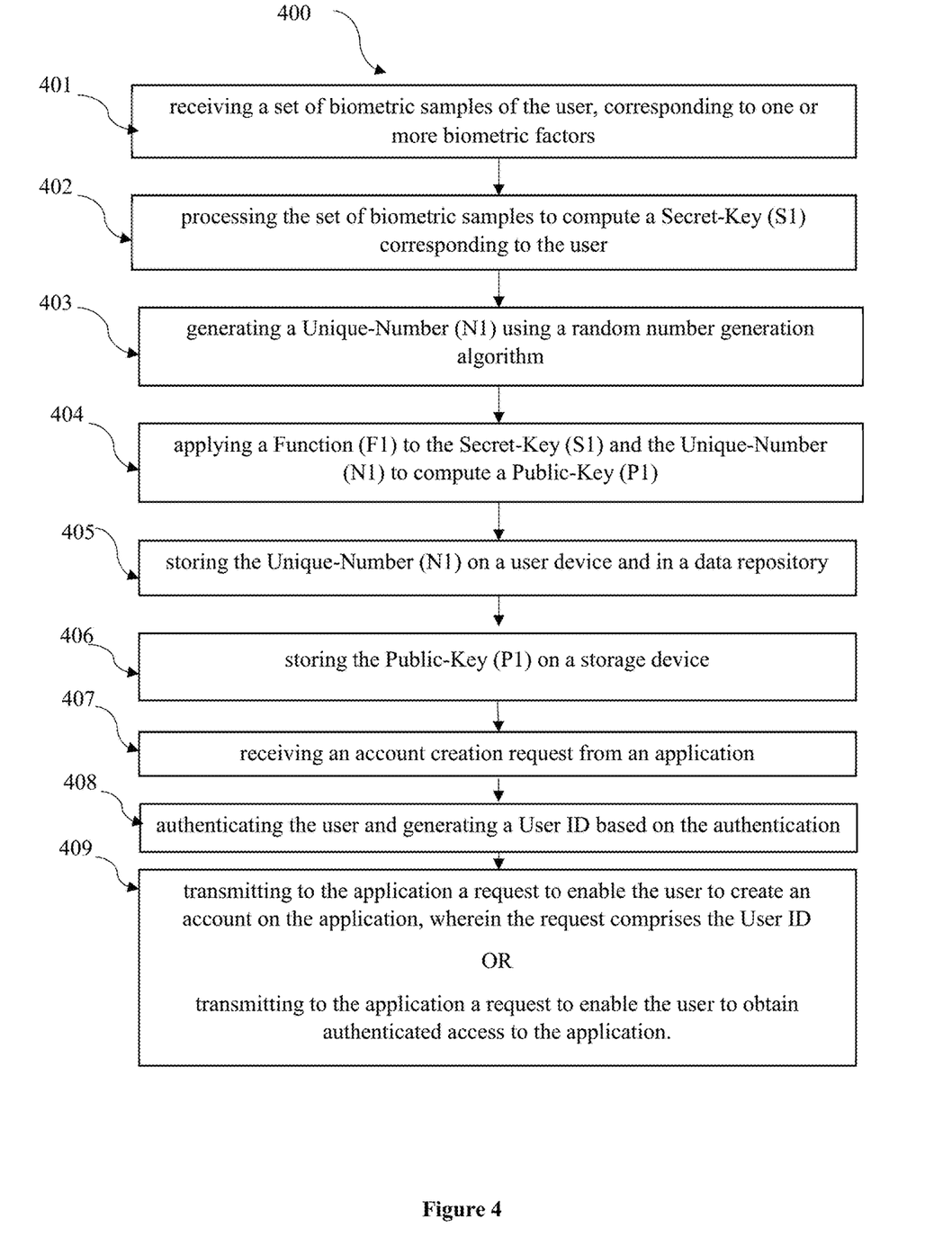
FIG. 4 illustrates a method 400 for user registration, in accordance with an embodiment of the present disclosure.

Now referring to FIG. 4, a method 400 for user registration is illustrated, in accordance with an embodiment of the present subject matter.

At step 401, the processor 201 may be configured for registering a user over the system 101. For the purpose of registration, a user may send a request for registration to the system 101 from the user device 103. Once the request is received, the processor 201 may receive a set of biometric samples of the user, corresponding to one or more biometric factors. The one or more biometric factors may correspond to fingerprint, face, voice, retina, and palm vein.

At step 402, the processor 201 may be configured to process the set of biometric samples to compute a Secret-Key (S1) corresponding to the user. For the purpose of computing the secret key (S1) a set of unique characteristics of the biometric samples may be determined. These unique characteristics must be reproducible every time the user scans their biometrics.

At step 403, the processor 201 may be configured to generate a Unique-Number (N1). The Unique-Number (N1) can be computed using any random number generation algorithm. The Unique-Number (N1) is a random number generated only once by the random number generation algorithm.

At step 404, the processor 201 may be configured to apply a Function (F1) to the Secret-Key (S1) and the Unique-Number (N1) to compute a Public-Key (P1). The Function (F1) may be based on Asymmetric Key Encryption which consumes the Secret-Key (S1) and the Unique-Number (N1) to compute a Public-Key (P1).

At step 405, the processor 201 may be configured to store the Unique-Number (N1) on the user device 103 and in a Data Repository 208.

At step 406, the Public-Key (P1) is stored on the storage device. Further, multiple users may be registered over the system 101. Every time the user makes a request to access the system 101/application 102 or makes a request to access the account created over the application, the Unique-Number (N1) and the Public-Key (P1) are used for authentication. It must be noted that the Secret-Key (S1) is not stored on the user device 103 or the system 101. Rather, at the time of authentication, the Secret-Key (S2) is computed in real-time.

At step 407, the processor 201 may be configured to receive an account creation request or login request from the application 102. The account creation request or a login request may be generated upon scanning of a machine-readable code. The machine-readable code may be in the form of a Barcode or a QR code. The login request may comprise a web socket ID. The communication of the system 101 with the application 102 is enabled using the web socket ID. Further, it must be noted that the signup or login page of the Application 102 may be accessed using a laptop or a desktop computer.

At step 408, the processor 201 may be configured to authenticate the user. The process for user authentication is stated in further detail with reference to the flow chart of FIG. 5.

At step 409, upon successful authentication of the user, the processor 201 may be configured to transmit, to the application, a request to enable the user to create an account on the application 102. The request may comprise the Application User ID of the user. In one embodiment, when the login request is received, the processor 201 may be configured to transmit to the application a request to enable the user to create an account on the application. Now referring to FIG. 5, a method 300 for user authentication is illustrated, in accordance with an embodiment of the present subject matter.

Figure 5:
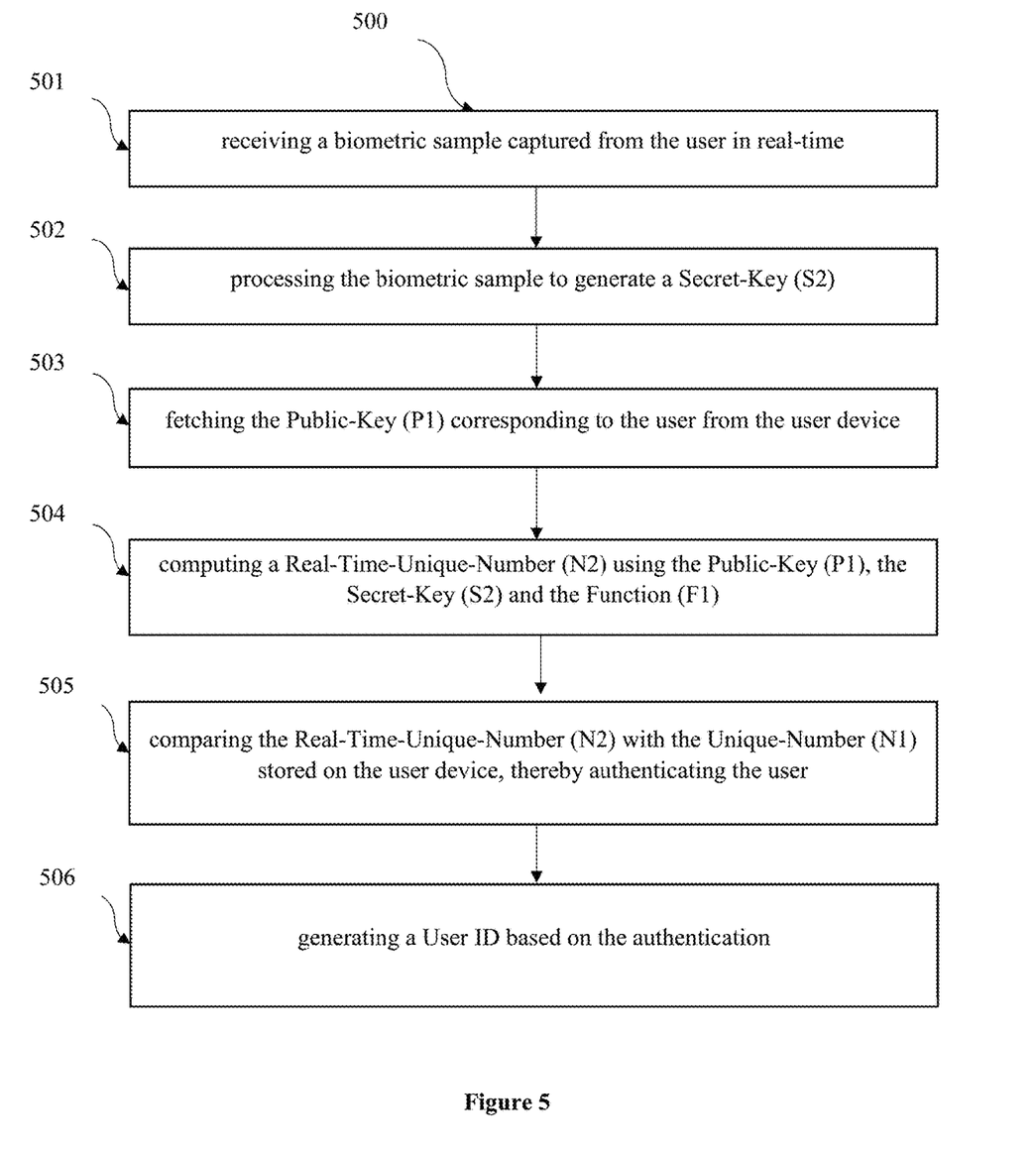
FIG. 5 illustrates a method 500 for user authentication, in accordance with an embodiment of the present disclosure.

At step 501, the processor 201 may be configured to receive a biometric sample from the user. The biometric sample may be captured from the user in real-time.

At step 502, the processor 201 may be configured to process the biometric sample to generate a Secret-Key (S2). It must be noted that the Secret-Key (S2) will be different from Secret-Key (S1) if the user is not the same person.

At step 503, the processor 201 may be configured to fetch the Public-Key (P1) corresponding to the user from the user device 103.

At step 504, the processor 201 may be configured to compute a Real-Time-Unique-Number (N2) using the Public-Key (P1), the Secret-Key (S2) and the Function (F1).

At step 505, the processor 201 may be configured to authenticate the user based on comparison of the Real-Time-Unique-Number (N2) with the Unique-Number (N1) stored on the user device 103. It must be noted that when biometric samples from the same user are captured, the Secret-Key (S2) generated in real-time is the same as the Secret-Key (S1) that was generated during user registration. As a result, the Real-Time-Unique-Number (N2) generated using the Public-Key (P1), the Secret-Key (S2) and the Function (F1) will be the same as the Unique-Number (N1) stored on the user device. In case false biometric samples are provided during authentication, the Secret-Key (S2) generated in real-time will not be the same as the Secret-Key (S1). Due to this, the Real-Time-Unique-Number (N2) will not match the Unique-Number (N1) and the authentication will fail. It must be noted that during the entire authentication process, the only connection established with the user is through biometric scanning. As a result, authentication fraud as well as duplicate account generation is prevented, while keeping the user's identity private, since there is no need for the user to share their phone number, email address, or any other personally identifiable information.

At step 506, if the user is successfully authenticated, the processor 201 may be configured to execute programmed instructions stored in the memory to transmit, to the application 102, an account creation request or a request to enable the user to obtain authenticated access to the application. The process for creating a new account over the application or enabling the user to login into the application 102 is illustrated below with reference to the user interface of FIGS. 6a and 6b.

Referring now to FIG. 6a the user interface of an application 102-1 is illustrated. The application 102-1 may be a news website. The user may access the signup page 601 of the application 102-1 using a desktop computer 600. Upon accessing the signup page 601, the user interface may display a set of account creation fields 603 and a QR code 605. In place of QR code 605, a barcode or any other two-dimensional or three-dimensional code may be displayed. The set of account creation fields 603 may be used by the user to register himself onto the platform. Alternatively, the user may scan the QR code 605 on the signup page 601 using the user device 103 in order to access the application 102-1 without revealing their identity to the application 102-1. The user device 103 may be configured to extract a web socket ID corresponding to the signup page 601 of the application 102-1. The communication of the system 101 with the application 102-1 is enabled using the web socket ID. The system 101 may be configured to first authenticate the user based on the steps disclosed in the method 500. If the user is authenticated, the system 101 is configured to use the web socket ID to communicate with the application 102-1 and enable the user to create an account and access the application 102-1 without providing any personal details to the application 102-1.

Referring now to FIG. 6b the user interface of an application 102-2 is illustrated. The application 102-2 may be a sports blog website. The user may access the login page 607 of the application 102-2 using the desktop computer 600. Upon accessing the login page 607, the user interface may display a set of account login fields 609 and a QR code 611. In place of QR code 611, a bar code or any other two-dimensional or three-dimensional code may be displayed. The set of account login fields 609 may be used by the user to login onto the application 102-2. Alternatively, the user may scan the QR code 611 on the login page 607 using the user device 103 in order to access the application 102-2 without revealing their identity to the application 102-2. The user device 103 may be configured to extract a web socket ID corresponding to the login page 607 of the application 102-2. The communication of the system 101 with the application 102-2 is enabled using the web socket ID. The system 101 may be configured to first authenticate the user based on the steps disclosed in the method 500.

If the user is authenticated, the system 101 is configured to use the web socket ID to communicate with the application 102-2 and enable the user to access the application 102-2 without providing any personal details to the application 102-2.

Although implementations for the system 101 and the method 300 for creating an account on an application and login into the application, without having the user reveal their identity, have been described in language specific to structural features and methods, it must be understood that the claims are not limited to the specific features or methods described. Rather, the specific features and methods are disclosed as examples of implementations for the system 101 and the method 300 for creating an account on the application and login into the application, without having the user reveal their identity.

The invention claimed is:

1. A system for enabling a user to create an account on an application, without having the user reveal their identity, the system comprising:
   a processor and a memory coupled to the processor, wherein the processor is configured to execute instructions stored in the memory for:
   registering a user by,
   receiving a set of biometric samples of the user, corresponding to one or more biometric factors,
   processing the set of biometric samples to compute a Secret-Key (S1) corresponding to the user, generating a Unique-Number (N1) using a random number generation algorithm,
applying a Function (F1) to the Secret-Key (S1) and the Unique-Number (N1) to compute a Public-Key (P1),
storing the Unique-Number (N1) on a user device and in a data repository, and
storing the Public-Key (P1) on a storage device;
receiving an account creation request from an application;
authenticating the user by,
receiving a biometric sample captured from the user in real-time,
processing the biometric sample to generate a Secret-Key (S2),
fetching the Public-Key (P1) corresponding to the user from the user device,
computing a Real-Time-Unique-Number (N2) using the Public-Key (P1), the Secret-Key (S2) and the Function (F1),
comparing the Real-Time-Unique-Number (N2) with the Unique-Number (N1) stored on the user device, thereby authenticating the user;
generating an Application User ID based on the authentication; and
transmitting to the application a request to enable the user to create an account on the application, wherein the request comprises the Application User ID.

2. The system of claim 1, wherein the account creation request is generated upon scanning a machine-readable code, wherein the account creation request comprises a web socket ID, wherein the communication with the application is enabled using the web socket ID.

3. The system of claim 1, wherein the application is a web-based application or a mobile application.

4. The system of claim 1, wherein the Application User ID is maintained at the user device.

5. The system of claim 1, wherein the one or more biometric factors correspond to fingerprint, face, voice, retina, and palm vein, wherein the set of biometric samples are captured by the user device.

6. A method for enabling a user to create an account on an application, without having the user reveal their identity, the method comprising steps of:
registering a user by,
receiving a set of biometric samples of the user, corresponding to one or more biometric factors,
processing the set of biometric samples to compute a Secret-Key (S1) corresponding to the user,
generating a Unique-Number (N1) using a random number generation algorithm,
applying a Function (F1) to the Secret-Key (S1) and the Unique-Number (N1) to compute a Public-Key (P1),
storing the Unique-Number (N1) on a user device and in a data repository, and storing the Public-Key (P1) on a storage device;
receiving an account creation request from an application;
authenticating the user by,
receiving a biometric sample captured from the user in real-time,
processing the biometric sample to generate a Secret-Key (S2),
fetching the Public-Key (P1) corresponding to the user from the user device,
computing a Real-Time-Unique-Number (N2) using the Public-Key (P1), the Secret-Key (S2) and the Function (F1),
comparing the Real-Time-Unique-Number (N2) with the Unique-Number (N1) stored on the user device, thereby authenticating the user;
generating an Application User ID based on the authentication; and
transmitting to the application a request to enable the user to create an account on the application, wherein the request comprises the Application User ID.

7. The method of claim 6, wherein the account creation request is generated upon scanning a machine-readable code, wherein the account creation request comprises a web socket ID, wherein the communication with the application is enabled using the web socket ID.

8. The method of claim 6, wherein the application is a web based application or a mobile application.

9. The method of claim 6, wherein the Application User ID is maintained at the user device.

10. The method of claim 6, wherein the one or more biometric factors correspond to fingerprint, face, voice, retina, and palm vein, wherein the set of biometric samples are captured by the user device.

11. A system for enabling a user to obtain authenticated access to an application, without having the user reveal their identity, the system comprising:
a processor and a memory coupled to the processor, wherein the processor is configured to execute instructions stored in the memory for:
registering a user by,
receiving a set of biometric samples of the user, corresponding to one or more biometric factors,
processing the set of biometric samples to compute a Secret-Key (S1) corresponding to the user,
generating a Unique-Number (N1) using a random number generation algorithm,
applying a Function (F1) to the Secret-Key (S1) and the Unique-Number (N1) to compute a Public-Key (P1),
storing the Unique-Number (N1) on a user device and in a data repository, and
storing the Public-Key (P1) on a storage device;
receiving a login request from an application;
authenticating the user by,
receiving a biometric sample captured from the user in real-time,
processing the biometric sample to generate a Secret-Key (S2),
fetching the Public-Key (P1) corresponding to the user from the user device,
computing a Real-Time-Unique-Number (N2) using the Public-Key (P1), the Secret-Key (S2) and the Function (F1),
comparing the Real-Time-Unique-Number (N2) with the Unique-Number (N1) stored on the user device, thereby authenticating the user; and
transmitting to the application a request to enable the user to obtain authenticated access to the application.

12. The system of claim 11, wherein the login request is generated upon scanning a machine-readable code, wherein the login request comprises a web socket ID, wherein the communication with the application is enabled using the web socket ID.

13. The system of claim 11, wherein the application is a web-based application or a mobile application.

14. The system of claim 11, wherein an Application User ID is generated during a signup process, wherein the Application User ID is maintained at the user device.

15. The system of claim 11, wherein the one or more biometric factors correspond to fingerprint, face, voice, retina, and palm vein, wherein the set of biometric samples are captured by the user device.

16. A method for enabling a user to obtain authenticated access to an application, without having the user reveal their identity, the method comprises steps of:
   registering a user by,
      receiving a set of biometric samples of the user, corresponding to one or more biometric factors,
      processing the set of biometric samples to compute a Secret-Key (S1) corresponding to the user,
      generating a Unique-Number (N1) using a random number generation algorithm,
      applying a Function (F1) to the Secret-Key (S1) and the Unique-Number (N1) to compute a Public-Key (P1),
      storing the Unique-Number (N1) on a user device and in a data repository, and
      storing the Public-Key (P1) on a storage device;
   receiving a login request from an application;
   authenticating the user by,
      receiving a biometric sample captured from the user in real-time,
      processing the biometric sample to generate a Secret-Key (S2),
      fetching the Public-Key (P1) corresponding to the user from the user device,
      computing a Real-Time-Unique-Number (N2) using the Public-Key (P1), the Secret-Key (S2) and the Function (F1),
      comparing the Real-Time-Unique-Number (N2) with the Unique-Number (N1) stored on the user device, thereby authenticating the user; and
   transmitting to the application a request to enable the user to obtain authenticated access to the application.

17. The method of claim 16, wherein the login request is generated upon scanning a machine-readable code, wherein the login request comprises a web socket ID, wherein the communication with the application is enabled using the web socket ID.

18. The method of claim 16, wherein the application is a web-based application or a mobile application.

19. The method of claim 16, wherein an Application User ID is generated during a signup process, wherein the Application User ID is maintained at the user device.

20. The method of claim 16, wherein the one or more biometric factors correspond to fingerprint, face, voice, retina, and palm vein, wherein the set of biometric samples are captured by the user device.

* * * * *